United States Patent
Yoshimoto et al.

(10) Patent No.: US 10,710,555 B2
(45) Date of Patent: Jul. 14, 2020

(54) WIPER BLADE AND METHOD FOR MANUFACTURING WIPER BLADE

(71) Applicant: ASMO CO., LTD., Shizuoka-ken (JP)

(72) Inventors: Takao Yoshimoto, Toyohashi (JP); Masahiro Oota, Hamamatsu (JP)

(73) Assignee: Denso Corporation, Kariya (JP)

( * ) Notice: Subject to any disclaimer, the term of this patent is extended or adjusted under 35 U.S.C. 154(b) by 149 days.

(21) Appl. No.: 15/492,903

(22) Filed: Apr. 20, 2017

(65) Prior Publication Data

US 2017/0217408 A1  Aug. 3, 2017

Related U.S. Application Data

(63) Continuation of application No. 14/768,564, filed as application No. PCT/JP2014/067395 on Jun. 30, 2014, now Pat. No. 9,981,636.

(30) Foreign Application Priority Data

Sep. 11, 2013 (JP) .................. 2013-188834
Oct. 16, 2013 (JP) .................. 2013-215435

(51) Int. Cl.
*B60S 1/38* (2006.01)
*B60S 1/40* (2006.01)
(Continued)

(52) U.S. Cl.
CPC ........ *B60S 1/3881* (2013.01); *B29C 45/0053* (2013.01); *B29C 45/33* (2013.01);
(Continued)

(58) Field of Classification Search
CPC .... B60S 1/3856; B60S 1/3881; B60S 1/3858; B60S 1/3853; B60S 1/3851
See application file for complete search history.

(56) References Cited

U.S. PATENT DOCUMENTS 3,480,985 A * 12/1969 Forster ................... B60S 1/34
15/250.34
6,427,283 B1   8/2002 Dietrich et al.
(Continued)

FOREIGN PATENT DOCUMENTS

CN   101056785 A   10/2007
CN   101098804 A   1/2008
(Continued)

OTHER PUBLICATIONS

WO2009071372A1 (machine translation), 2009.*
(Continued)

*Primary Examiner* — Andrew A Horton
(74) *Attorney, Agent, or Firm* — Patterson Thuente Pedersen, P.A.

(57) ABSTRACT

A wiper blade extends in the longitudinal direction and includes blade rubber, a plate spring-like backing, and a rubber holder. The blade rubber wipes a surface to be wiped. The backing imparts rigidity and elasticity to the blade rubber. The rubber holder holds both the longitudinally intermediate section of the blade rubber and the longitudinally intermediate section of the backing. The rubber holder has a backing housing hole for housing and retaining the backing. The backing housing hole longitudinally extends through the rubber holder. A parting line is set at the longitudinal center of the backing housing hole.

14 Claims, 6 Drawing Sheets

(51) Int. Cl.
*B29C 45/33* (2006.01)
*B29C 45/00* (2006.01)
*B29K 21/00* (2006.01)
*B29L 31/30* (2006.01)
*B29K 23/00* (2006.01)

(52) U.S. Cl.
CPC ............ *B60S 1/381* (2013.01); *B60S 1/3856* (2013.01); *B60S 1/3867* (2013.01); *B60S 1/3879* (2013.01); *B60S 1/4048* (2013.01); *B29C 2045/0093* (2013.01); *B29K 2021/00* (2013.01); *B29K 2023/12* (2013.01); *B29L 2031/305* (2013.01); *B60S 2001/4051* (2013.01); *B60S 2001/4054* (2013.01)

(56) References Cited

U.S. PATENT DOCUMENTS

| | | | |
|---|---|---|---|
| 6,449,797 | B1 | 9/2002 | De Block |
| 6,966,096 | B2 | 11/2005 | Baseotto et al. |
| 7,143,463 | B2 | 12/2006 | Baseotto et al. |
| 9,981,636 | B2 * | 5/2018 | Yoshimoto .............. B60S 1/381 |
| 2006/0037167 | A1 * | 2/2006 | Nacamuli ................. B60S 1/38 15/250.201 |
| 2007/0113366 | A1 | 5/2007 | Walworth et al. |
| 2007/0204422 | A1 | 9/2007 | Machida et al. |
| 2008/0022478 | A1 | 1/2008 | Jarasson et al. |
| 2008/0098559 | A1 | 5/2008 | Machida et al. |
| 2008/0289133 | A1 * | 11/2008 | Kim ........................ B60S 1/387 15/250.32 |
| 2008/0313841 | A1 | 12/2008 | De Block et al. |
| 2009/0089956 | A1 * | 4/2009 | De Block ............. B60S 1/3877 15/250.201 |
| 2010/0139026 | A1 * | 6/2010 | Ku .......................... B60S 1/381 15/250.201 |
| 2010/0257687 | A1 | 10/2010 | Huang |
| 2011/0247167 | A1 * | 10/2011 | Huang ................. B60S 1/3881 15/250.32 |
| 2012/0198648 | A1 * | 8/2012 | Wilms .................... B60S 1/381 15/250.48 |
| 2013/0067676 | A1 | 3/2013 | Yoshimoto et al. |
| 2013/0152320 | A1 | 6/2013 | Matsumoto |
| 2013/0239353 | A1 | 9/2013 | Yoshimoto et al. |
| 2013/0239356 | A1 | 9/2013 | Yoshimoto et al. |
| 2014/0352099 | A1 | 12/2014 | Fujiwara et al. |

FOREIGN PATENT DOCUMENTS

| | | | |
|---|---|---|---|
| CN | 100577481 | C | 1/2010 |
| JP | 07-137123 | A | 5/1995 |
| JP | 2001-516310 | A | 9/2001 |
| JP | 2007-532380 | A | 11/2007 |
| JP | 2008-254697 | A | 10/2008 |
| JP | 2011218853 | | 11/2011 |
| JP | 2011251568 | A | 12/2011 |
| JP | 2012-136149 | A | 7/2012 |
| JP | 2012-224231 | A | 11/2012 |
| JP | 2013-500898 | A | 1/2013 |
| JP | 2013-063674 | A | 4/2013 |
| JP | 2013-086730 | A | 5/2013 |
| WO | WO 99/36300 | | 7/1999 |
| WO | WO 2000/48876 | A1 | 8/2000 |
| WO | WO 2009071372 | A1 * | 6/2009 ............. B60S 1/387 |

OTHER PUBLICATIONS

Japanese Office Action from Application No. 2013-215435, dated Aug. 29, 2017 (Office Action—3 pgs.; English Translation of Office Action—3 pgs.) 6 pgs.
PCT International Search Report with English translation for International Application No. PCT/JP2014/067395, dated Sep. 30, 2014, 5 pages.
International Preliminary Report on Patentability for Application No. PCT/JP2014/067385, dated Mar. 15, 2016 (4 pgs.).
Chinese Office Action for Application No. 201480009366.3, dated Apr. 5, 2017, Office Action and Translation (18 pgs: Chinese Office Action—8 pgs; Translation—10 pgs).
Japanese Office Action for Application No. 2013-215435, dated Jun. 26, 2017 (Office Action—3 pgs; Machine Translation—3 pgs) 6 pgs total.
Japanese Office Action for Application No. 2017-201757, dated Jan. 29, 2019 (5 pgs).

* cited by examiner

WIPER BLADE AND METHOD FOR MANUFACTURING WIPER BLADE

RELATED APPLICATIONS

The present application is a continuation of U.S. application Ser. No. 14/768,564, filed Aug. 18, 2015, entitled "Wiper Blade and Method for Manufacturing Wiper Blade" which is a national stage entry of PCT Application No. PCT/JP2014/067395, filed Jun. 30, 2014, which claims priority to JP 2013-188834, filed Sep. 11, 2013 and claims priority to JP 2013-215435, filed Oct. 16, 2013, each of which is hereby fully incorporated herein by reference in their entireties.

TECHNICAL FIELD

The present invention relates to a wiper blade for a vehicle wiper and a method for manufacturing the wiper blade.

BACKGROUND ART

A conventional vehicle wiper is formed by a wiper arm and a wiper blade, which is coupled to the wiper arm. For example, patent document 1 describes a wiper blade including a coupling lever that holds a longitudinally intermediate portion of a blade rubber and a longitudinally intermediate portion of a backing. The coupling lever is formed from a resin and hollow in the longitudinal direction of the backing. The coupling lever surrounds the backing to accommodate and hold the backing.

PRIOR ART DOCUMENT

Patent Document

Patent Document 1: Japanese Laid-Open Patent Publication No. 2013-63674

SUMMARY OF THE INVENTION

A coupling lever such as that described above is generally manufactured through injection molding. When molding a portion that accommodates the backing, injection molding is generally performed so that the portion accommodating the backing includes a single draft slope that extends continuously from one longitudinal end to the other longitudinal end of the portion. This facilitates the removal of a mold (slide core).

However, when a coupling lever having a draft slope such as that described above is coupled to a wiper arm, an urging force tends to be unevenly transmitted from the wiper arm to one longitudinal side of the backing. This adversely affects the wiping performance.

It is an object of the present invention to provide a wiper blade and a method for manufacturing a rubber holder that facilitates even transmission of an urging force from a wiper arm to a backing in the longitudinal direction, thereby obtaining a favorable wiping performance.

To achieve the above object, one aspect of the present invention is a wiper blade that extends in a longitudinal direction and includes a blade rubber, a plate spring-like backing, and a rubber holder. The blade rubber is used to wipe a wiped surface. The backing adds rigidity and elasticity to the blade rubber. The rubber holder holds an intermediate portion of the blade rubber in the longitudinal direction and an intermediate portion of the backing in the longitudinal direction. The rubber holder includes a backing accommodation slot that accommodates and holds the backing. The backing accommodation slot extends through the rubber holder in the longitudinal direction. The parting line is set in a middle section of the backing accommodation slot in the longitudinal direction.

DETAILED DESCRIPTION OF THE PREFERRED EMBODIMENTS

One embodiment of a vehicle wiper will now be described with reference to FIGS. 1 to 9. Here, "longitudinal direction" refers to the direction in which the long sides of a wiper blade 3 extend unless otherwise specified. The direction in which the long sides of a blade rubber 11, a backing 12, and a rubber holder 13 each extend is substantially the same as the longitudinal direction of the wiper blade 3.

Figure 1:
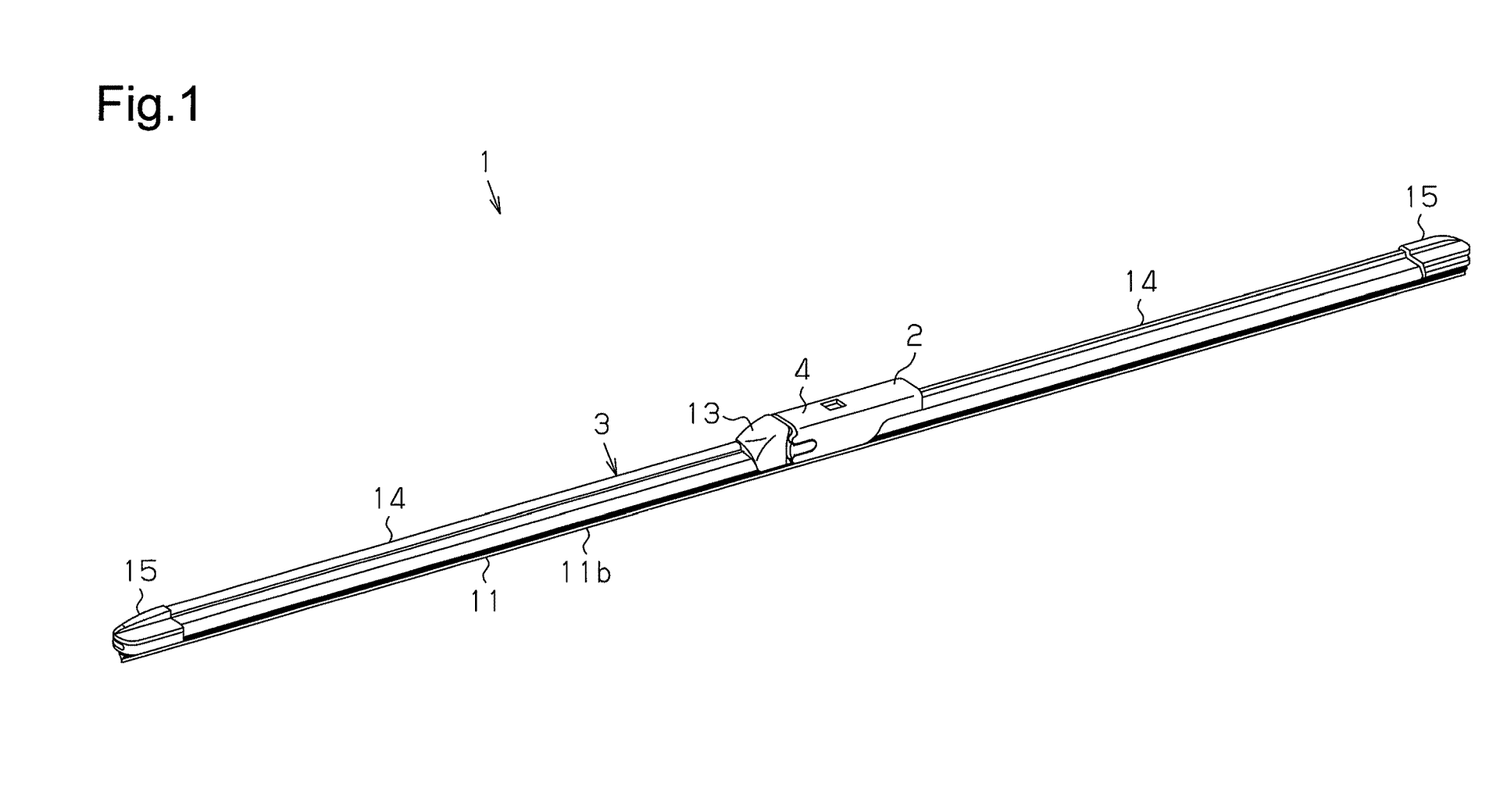
FIG. 1 is a perspective view of one embodiment of a wiper according to the present invention.

As shown in FIG. 1, a wiper 1 for a vehicle is used to wipe off rain drops and the like from a windshield, which serves as a wiped surface of an automobile. The wiper 1 includes a wiper arm 2 and the wiper blade 3, which is coupled to the wiper arm 2. The drawing shows only the distal portion of the wiper arm 2. The basal portion of the wiper arm 2 is fixed to a pivot shaft (not shown), which is reciprocally rotated by a predetermined angle with the drive force of a wiper motor (not shown). The wiper arm 2 reciprocally pivots in accordance with the reciprocal rotation of the pivot shaft. The wiper arm 2 includes a distal coupling portion 4, which is urged by an urging mechanism (no shown) toward the windshield (wiped surface). The wiper blade 3 is coupled to the distal coupling portion 4 of the wiper arm 2.

Figure 2:
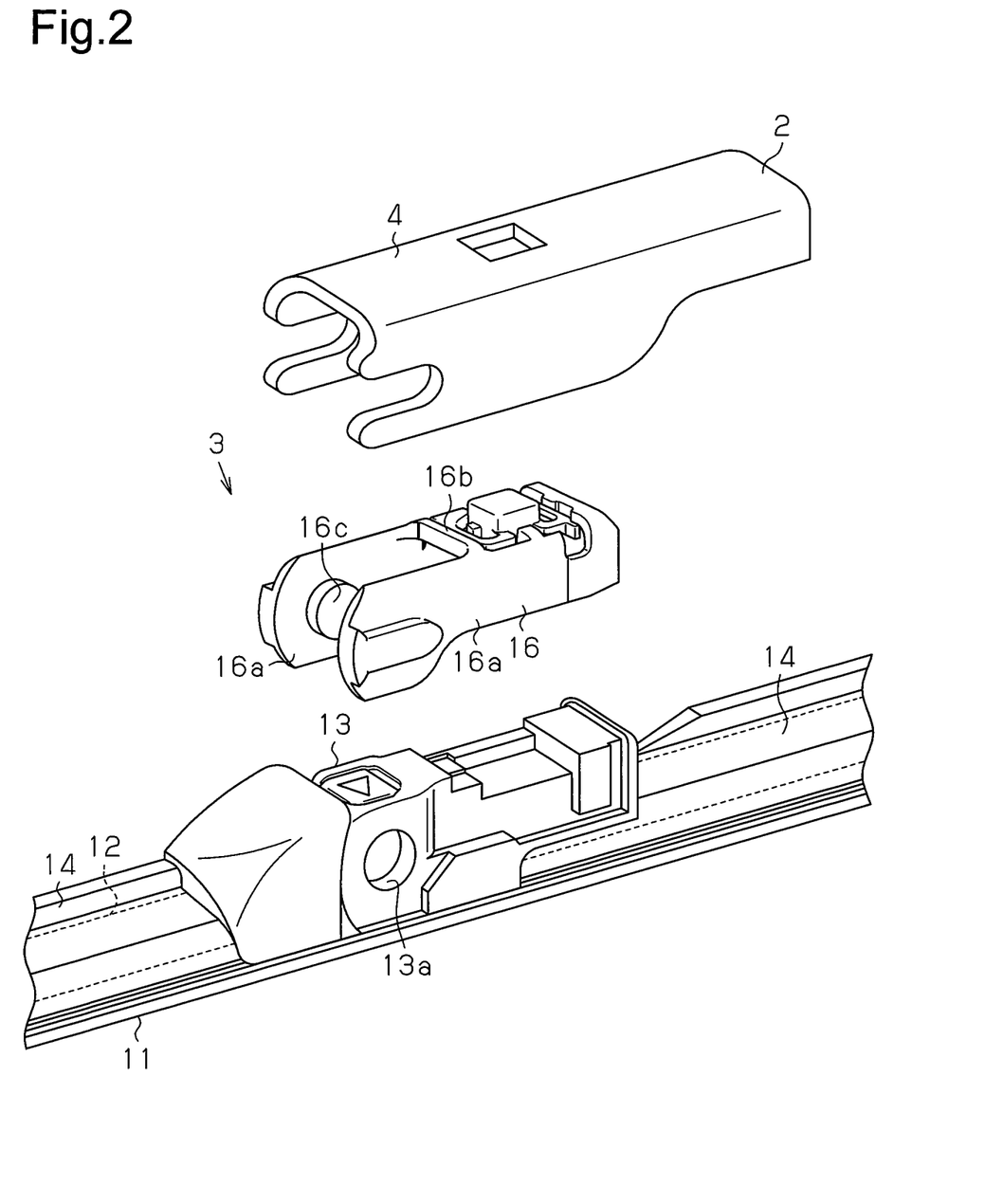
FIG. 2 is an exploded perspective view of a portion of the wiper shown in FIG. 1.
Figure 3:
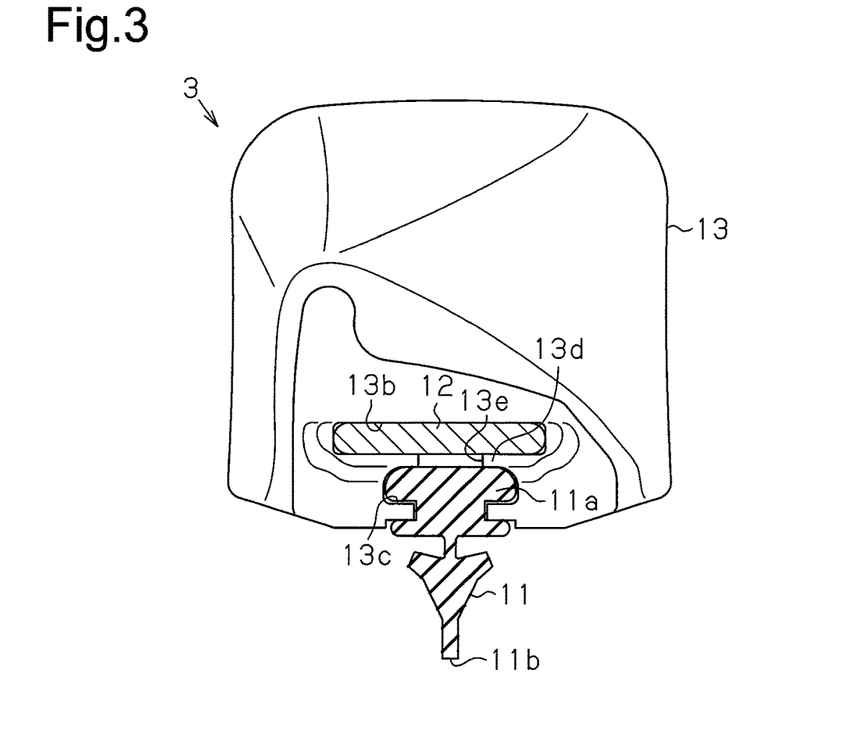
FIG. 3 is a front view of a rubber holder, a backing, and a blade rubber of the embodiment when coupled.
Figure 4:
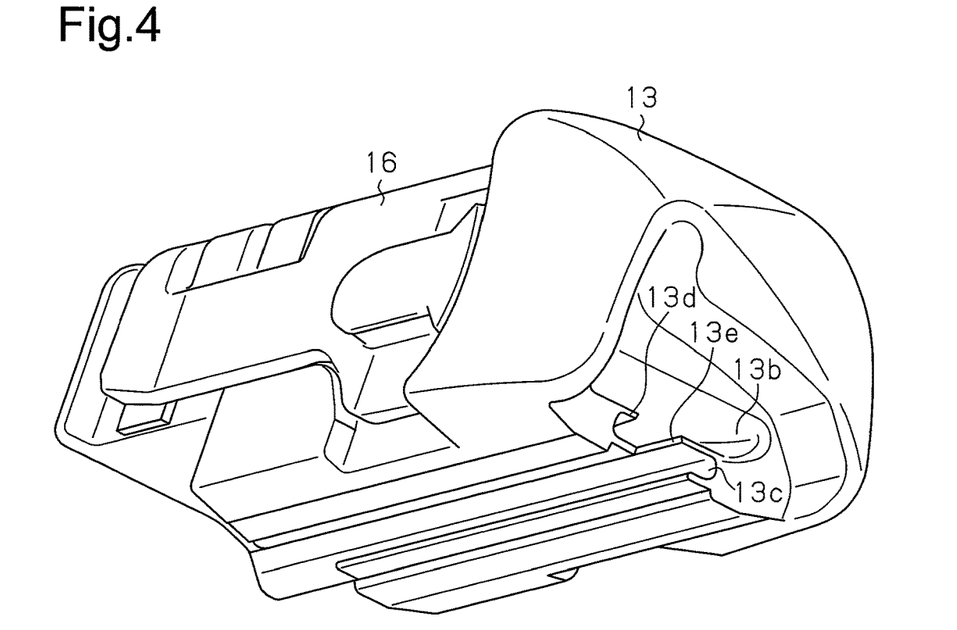
FIG. 4 is a perspective view of a rubber holder and a clip shown in FIG. 2.
Figure 5:
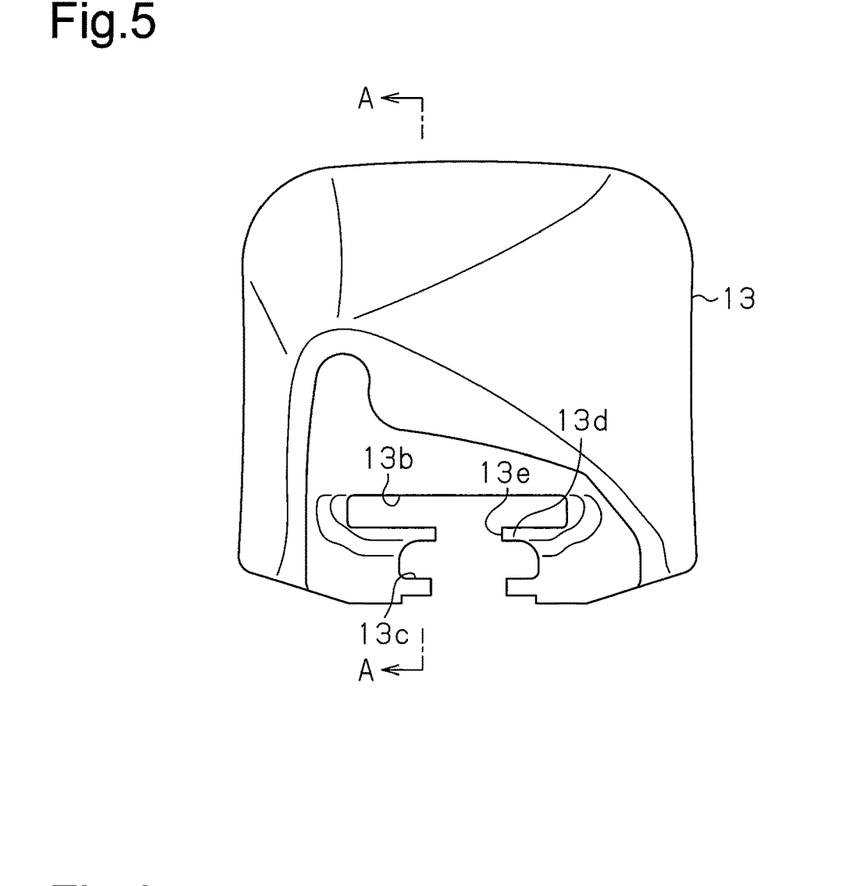
FIG. 5 is a front view of the rubber holder shown in FIG. 4.
Figure 6:
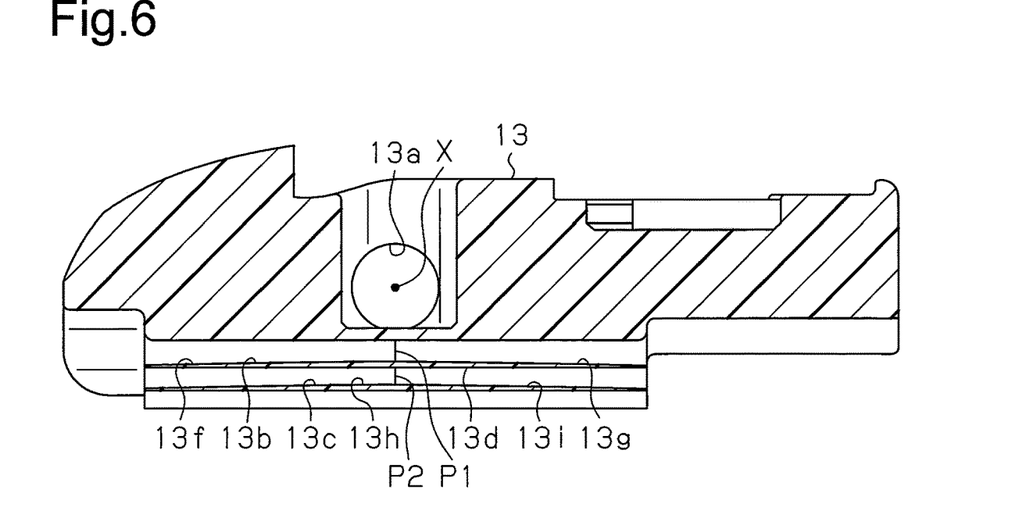
FIG. 6 is a cross-sectional view of FIG. 5 taken along line A-A.

As shown in FIGS. 2 and 3, the wiper blade 3 includes an elongated blade rubber 11, a plate spring-like backing 12, and a rubber holder 13. The wiped surface (windshield) is wiped with the blade rubber 11. The backing 12 provides the blade rubber 11 with rigidity (mainly, lateral rigidity, or rigidity in a wiping direction of the wiper blade 3) and elasticity (mainly, vertical elasticity, or elasticity of the blade rubber 11 toward the wiped surface). The rubber holder 13 holds a longitudinally intermediate portion of an upper portion 11a of the blade rubber 11 and a longitudinally intermediate portion of the backing 12. In the upper portion 11a of the blade rubber 11 and in the backing 12, the two longitudinal sides projecting out of the rubber holder 13 are covered by two flexible cases 14, and the two opposite ends are covered by caps 15, respectively (refer to FIG. 1). The backing 12 has substantially the same length as the blade rubber 11. The backing 12 is wider than the blade rubber 11. The backing 12 is curved (bulged outward toward a side opposite to the wiped surface and curved in the longitudinal direction) as viewed from the side. Thus, when the wiper blade 3 is urged toward a curved wiped surface (windshield), the backing 12 acts to force a wiping portion 11b of the blade rubber 11 located at a lower end against the wiped surface (windshield) in a favorable manner. In this case, the wiper case 14 is formed from a flexible resin material or a rubber material so as not to interfere with the action of the backing 12.

As shown in FIG. 2, the wiper blade 3 includes a clip 16. The clip 16 functions as a wiper arm coupling member that is coupled to the rubber holder 13 and pivotal about an axis extending in the lateral direction of the blade rubber 11. More specifically, the rubber holder 13 is formed from a resin material. A shaft insertion hole 13a extends through the rubber holder 13 in the lateral direction at a longitudinally and vertically middle location. The shaft insertion hole 13a functions as a support. The clip 16 is formed from a resin material. The clip 16 includes two side walls 16a, an upper wall 16b, and support shafts 16c. The side walls 16a extend along two side surfaces of the rubber holder 13, respectively. The upper wall 16b connects the side walls 16a and extends along an upper surface of the rubber holder 13. The support shafts 16c coaxially project from inner surfaces of the side walls 16a. When the support shafts 16c are inserted into the shaft insertion hole 13a, the clip 16 is pivotally supported relative to the rubber holder 13.

The distal coupling portion 4 of the wiper arm 2 is fitted onto the clip 16.

The structure of the rubber holder 13 holding the backing 12 and the upper portion 11a of the blade rubber 11 will now be described in detail.

As shown in FIGS. 3 to 6, a backing accommodation slot 13b is formed in a lower portion of the rubber holder 13. The backing accommodation slot 13b, which surrounds the backing 12, accommodates and holds the backing 12. The backing accommodation slot 13b extends through the rubber holder 13 in the longitudinal direction.

The lower portion of the rubber holder 13 also includes a blade rubber accommodation slot 13c that accommodates and holds the upper portion 11a of the blade rubber 11 by surrounding the upper portion 11a of the blade rubber 11. The blade rubber accommodation slot 13c is spaced apart from and located below the backing accommodation slot 13b. The blade rubber accommodation slot 13c extends through the rubber holder 13 in the longitudinal direction. At a laterally middle location, the blade rubber accommodation slot 13c opens at the lower portion of the rubber holder 13. In the present embodiment, the upper portion 11a of the blade rubber 11 is smaller in width than the backing 12. Accordingly, the blade rubber accommodation slot 13c is smaller in width than the backing accommodation slot 13b.

The rubber holder 13 includes a wall 13d between the backing accommodation slot 13b and the blade rubber accommodation slot 13c. The wall 13d includes a slit 13e extending vertically through a portion of the wall 13d. The slit 13e of the present embodiment is arranged in a middle location of the wall 13d in the lateral direction and extends throughout the wall 13d in the longitudinal direction.

Figure 7:
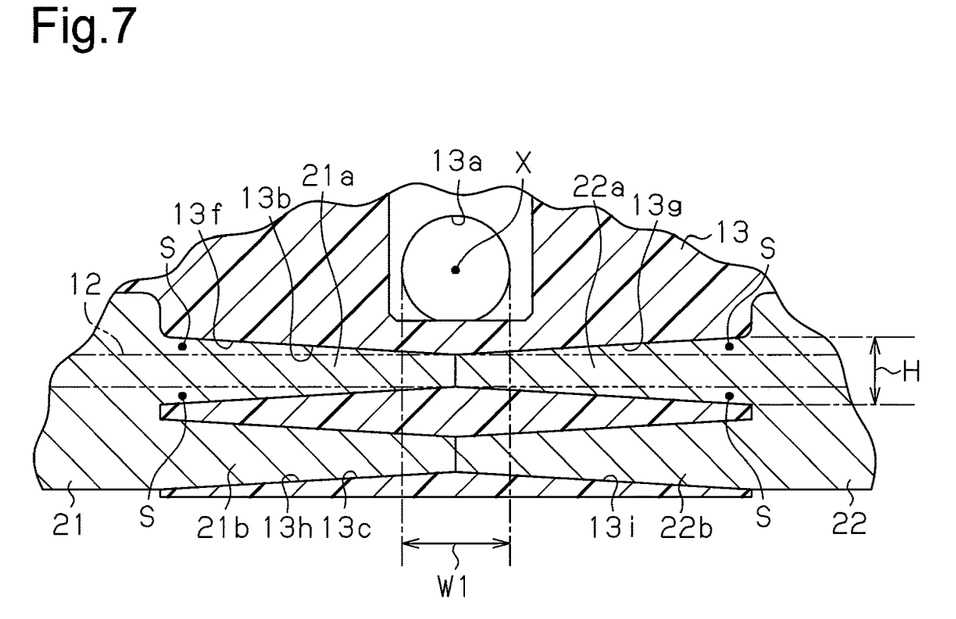
FIG. 7 is a schematic diagram illustrating draft slopes and rubber-side draft slopes of the embodiment.

As shown in FIG. 7, the backing accommodation slot 13b includes draft slopes 13f, 13g. Joining surfaces of slide cores 21, 22, which form a mold for injection molding (described later), are located at the longitudinally middle section of the backing accommodation slot 13b. The joining surfaces set a parting line P1 (refer to FIG. 6). The draft slopes 13f, 13g are located at opposite sides of the longitudinally middle section of the backing accommodation slot 13b. The draft slopes 13f, 13g each extend at a descending gradient toward the outer side from the opposite sides of the middle section of the backing accommodation slot 13b. In the present embodiment, the parting line P1 is set in range W1 that corresponds to the shaft insertion hole 13a in the longitudinal direction of the backing accommodation slot 13b. The draft slopes 13f, 13g extend from range W1 toward opposite sides in the longitudinal direction, that is, toward the outer sides. More specifically, the parting line P1 of the present embodiment is set at a position corresponding to (immediately below) an axis X of the shaft insertion hole 13a. The draft slopes 13f, 13g extend from a longitudinal position corresponding to (immediately below) the axis X toward the opposite sides in the longitudinal direction. In the present embodiment, the position corresponding to (immediately below) the axis X conforms to the center position of the backing accommodation slot 13b in the longitudinal direction. Additionally, in the present embodiment, each of the draft slopes 13f, 13g is straight and inclined relative to a straight line extending in the longitudinal direction as viewed from the side.

The blade rubber accommodation slot 13c includes rubber-side draft slopes 13h, 13i. In the same manner as the backing accommodation slot 13b, the joining surfaces of the slide cores 21, 22, which form the mold for injection molding, is located at the longitudinally middle section of the blade rubber accommodation slot 13c. The joining surfaces set a rubber-side parting line P2 (refer to FIG. 6). The rubber-side draft slopes 13h, 13i are located at opposite sides of the longitudinally middle section of the blade rubber accommodation slot 13c. The rubber-side draft slopes 13h, 13i each extend at a descending gradient toward the outer side from the opposite sides of the middle section of the blade rubber accommodation slot 13c. In the same manner as the parting line P1 of the backing accommodation slot 13b, the rubber-side parting line P2 of the present embodiment is set in range W1, which corresponds to the shaft insertion hole 13a in the longitudinal direction. The rubber-side draft slopes 13h, 13i extend from a longitudinal position corresponding to (immediately below) the axis X of the blade rubber accommodation slot 13c toward the opposite sides in the longitudinal direction, that is, toward the outer sides. To facilitate visual understanding, the gradients (angles relative to a straight line extending in the longitudinal direction) of the draft slopes 13f, 13g and the rubber-side draft slopes 13h, 13i are exaggerated in FIG. 7.

A method for manufacturing the rubber holder 13 will now be described.

In the method for manufacturing the rubber holder 13, the backing accommodation slot 13b is formed through injection molding. The injection molding forms the draft slopes 13f, 13g at the opposite sides of the longitudinally middle section of the backing accommodation slot 13b. As described above, the draft slopes 13f, 13g each extend at a descending gradient toward the outer side. In the injection molding process of the present embodiment, the rubber-side draft slopes 13h, 13i are also simultaneously formed.

More specifically, as shown in FIG. 7, the two slide cores 21, 22 are used in the injection molding process. The slide core 21, which is located at one side (left side in FIG. 7), includes a first projection 21a and a second projection 21b, each tapered toward the other side (right side in FIG. 7) as viewed from the side, to form the draft slope 13f and the rubber-side draft slope 13h, which are respectively located at one side of the longitudinally middle sections of the backing accommodation slot 13b and the blade rubber accommodation slot 13c. Additionally, the slide core 22, which is located at the other side (right side in FIG. 7), includes a first projection 22a and a second projection 22b, each tapered toward the one side (left side in FIG. 7) as viewed from the side, to form the draft slope 13g and the rubber-side draft slope 13i, which are respectively located at the other side of the longitudinally middle sections of the backing accommodation slot 13b and the blade rubber accommodation slot 13c.

When the slide cores 21, 22 are in contact, the mold is filled with a molten resin. After the molten resin is cured, the slide cores 21, 22 are separated from each other. This manufactures the rubber holder 13 including the backing accommodation slot 13b and the blade rubber accommodation slot 13c.

The structure of the wiper case 14 will now be described.

Figure 9:
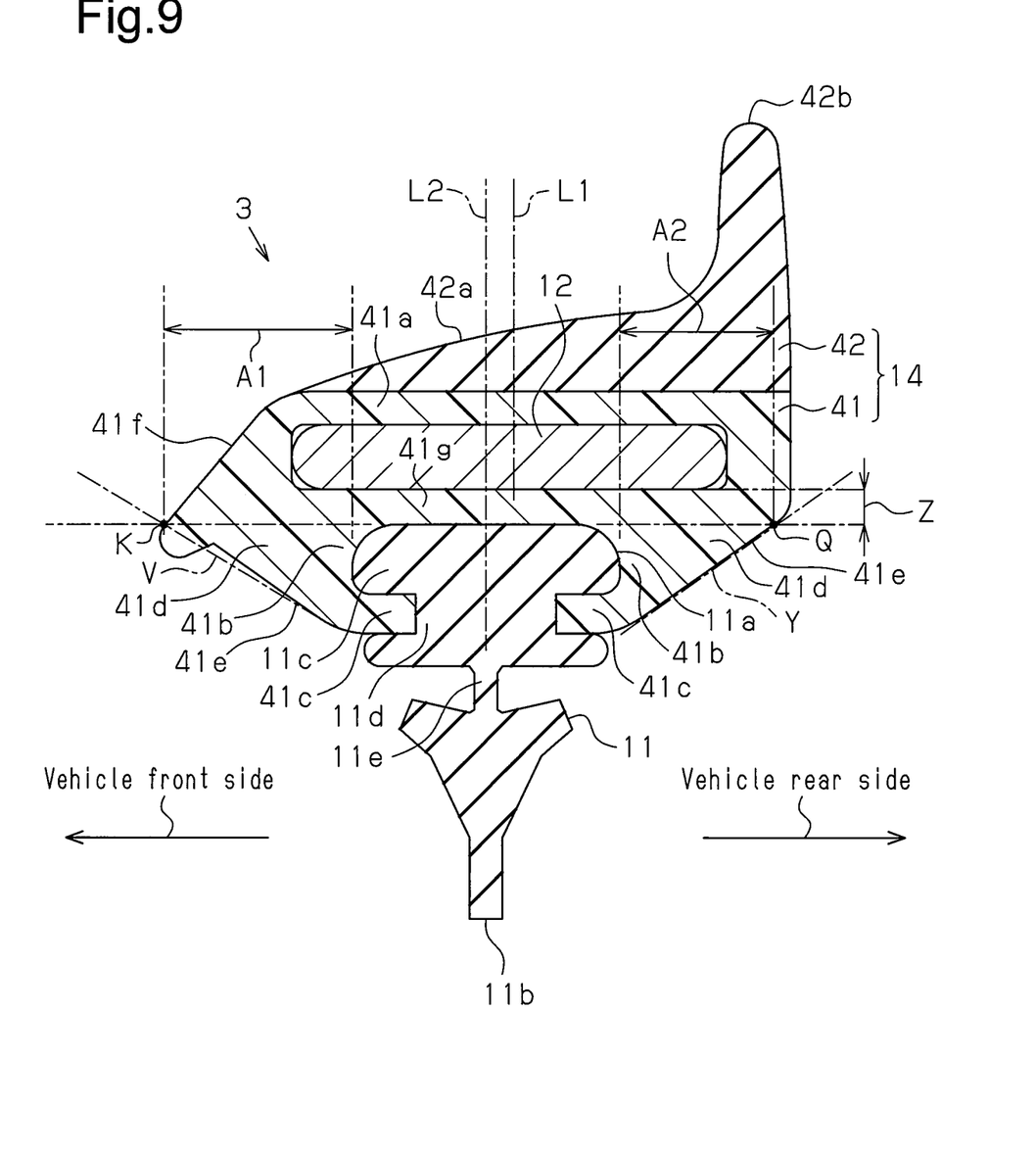
FIG. 9 is a cross-sectional view of a wiper blade of the embodiment.

As shown in FIG. 9, the blade rubber 11 includes a head 11c, a narrow portion 11d, the wiping portion 11b, and a neck 11e. The head 11c and the narrow portion 11d are arranged in the upper portion 11a. The narrow portion 11d has a smaller width than the head 11c and extends downward. The wiping portion 11b is arranged in a lower portion and used to wipe the wiped surface. The neck 11e connects the wiping portion 11b in a tiltable manner relative to the upper portion 11a.

The wiper case 14 includes a case body 41 and a fin 42. The case body 41 is formed from a flexible resin material (polypropylene, in the present embodiment) and holds the upper portion 11a (head 11c) of the blade rubber 11 and the backing 12. The fin 42 is formed from a rubber material or an elastomer and fastened to an upper portion of the case body 41.

The case body 41 includes a tetragonal tubular receptacle 41a, two lower extensions 41b, and claws 41c. The receptacle 41a accommodates and holds the backing 12. The lower extensions 41b extend downward from the receptacle 41a and cover front and rear sides of the head 11c, respectively. The claws 41c respectively extend toward each other from lower ends of the lower extensions 41b. The claws 41c are opposed to a lower surface of the head 11c and hold the head 11c.

Each lower extension 41b includes a thick portion 41d located at a basal side of the lower extension 41b. More specifically, the thick portions 41d are laterally outer sections of the wiper case 14 and located at outer sides of the claws 41c in the lateral direction of the wiper case 14. The thicknesses A1, A2 of the thick portions 41d in the lateral direction (left-right direction in FIG. 9) are each greater than the thickness Z (in a heightwise direction) of a portion of the receptacle 41a located between the backing 12 and the head 11c. In other words, the thick portions 41d limit deformation of the lower extensions 41b relative to the basal ends of the lower extensions 41b that would separate the claws 41c, or from the upper ends of the portion connected to the receptacle 41a. Each thick portion 41d of the present embodiment includes an inclined surface 41e that is inclined so that the thick portion 41d widens toward the upper side. More specifically, in a cross-sectional view taken in a direction orthogonal to the longitudinal direction of the case body 41 (refer to FIG. 9), a straight line lying along a lower surface of a lower wall 41g of the receptacle 41a includes a point intersecting with a front outer surface of the case body 41, which is referred to as a front edge K, and a point intersecting with a rear outer surface of the case body 41, which is referred to as a rear edge Q. The front edge K and the rear edge Q of the receptacle 41a are each connected to a base of the corresponding claw 41c by line segments V, Y, respectively. The laterally inner sides of the line segments V, Y are filled with the flexible resin material to form a solid that defines the lower extensions 41b including the thick portions 41d. In this case, the thick portions 41d include surfaces extending generally along the segment lines V, Y defining the inclined surfaces 41e.

In the present embodiment, the lateral center line L1 of the receptacle 41a is offset toward the rear of the vehicle (right side in FIG. 9) from the lateral center line L2 between the claws 41c. That is, in the present embodiment, the backing 12 and the blade rubber 11 are held so that the lateral center line L1 of the backing 12 is located toward the rear of the vehicle (right side in FIG. 9) from the lateral center line L2 of the blade rubber 11.

Additionally, the receptacle 41a includes a body fin 41f at the vehicle front side (left side in FIG. 9). The body fin 41f is inclined downward toward the vehicle front side. The body fin 41f of the present embodiment extends to a vertically intermediate position of the lower extensions 41b.

The fin 42 includes a fin inclined portion 42a and a projection 42b. The fin inclined portion 42a is fastened to the upper surface of the receptacle 41a excluding the body fin 41f and is inclined upward toward the vehicle rear side. The projection 42b projects upward at the vehicle rear side.

The body fin 41f, the fin inclined portion 42a, and the projection 42b act to convert an air flow produced when the vehicle is travelling to a pressing force acting on the wiped surface (lower side).

The operation of the wiper 1, which is configured in the above manner, will now be described.

In the wiper 1, the wiper blade 3 (excluding the clip 16) is pivotal about the wiper arm 2 and the clip 16, which is fixed to the distal coupling portion 4 of the wiper blade 3. The distal coupling portion 4 of the wiper arm 2 is urged toward the windshield (wiped surface) by the urging mechanism (not shown). The urging force is transmitted to the blade rubber 11 through the clip 16, the rubber holder 13, and the backing 12. Consequently, the wiping portion 11b, which is located at the lower end of the blade rubber 11, is pressed against the windshield (wiped surface) entirely in the longitudinal direction. In this case, the flexible wiper case 14 does not interfere with the operation of the curved backing 12. When the wiper arm 2 reciprocally pivots about the pivot shaft, the wiping operation is performed.

The present embodiment has the advantages described below.

(1) The parting line P1 is set in the longitudinally middle section of the backing accommodation slot 13b. Thus, the difference in a gap S, which results from the draft angle, between the backing accommodation slot 13b and the backing 12 at the two longitudinal ends is smaller compared to when a parting line is set at one of the longitudinal ends. This facilitates even supporting of the backing 12 in the longitudinal direction. Consequently, urging force is easily and evenly transmitted from the coupled wiper arm 2 to the backing 12 in the longitudinal direction. This obtains a favorable wiping performance. Additionally, the maximum height H of the backing accommodation slot 13b in the heightwise direction may decrease compared to when a parting line is set at one longitudinal end, which would form a single draft slope extending continuously from one end to the other end. This decreases, for example, the thickness of the wall 13d, thereby reducing the size of the rubber holder 13 in the heightwise direction.

(2) The parting line P1 is set in the range W1, which corresponds to the shaft insertion hole 13a in the longitudinal direction. The backing accommodation slot 13b includes the draft slopes 13f, 13g located at the opposite sides of the longitudinally middle section of the backing accommodation slot 13b. The draft slopes 13f, 13g each extend from the middle section of the backing accommodation slot 13b toward the outer side. Thus, the gap S between the backing 12 and the backing accommodation slot 13b is the smallest at the parting line P1, which is set in the range W1 corresponding to the shaft insertion hole 13a. This further easily transmits even urging force from the wiper arm 2, which is coupled by the clip 16, to the backing 12 in the longitudinal direction. Consequently, the wiping performance may be further improved. Additionally, the draft slopes 13f, 13g of the present embodiment extend toward the longitudinally opposite sides from a position of the backing accommodation slot 13b corresponding to (immediately below) the axis X of the shaft insertion hole 13a in the longitudinal direction. Thus, the gap S between the backing accommodation slot 13b and the backing 12 is the smallest at the position corresponding to (immediately below) the axis X of the shaft insertion hole 13a. This further easily transmits even urging force from the wiper arm 2, which is coupled by the clip 16, to the backing 12 in the longitudinal direction. Consequently, the wiping performance may be further improved.

(3) The rubber-side parting line P2 is set in the longitudinally middle section of the blade rubber accommodation slot 13c. Thus, the rubber-side draft slopes 13h, 13i extend from the longitudinally middle section of the blade rubber accommodation slot 13c toward the longitudinally opposite sides. This decreases the maximum height of the blade rubber accommodation slot 13c in the heightwise direction compared to when a rubber-side parting line is set at one end in the longitudinal direction. As a result, for example, the thickness of the wall 13d may decrease, thereby reducing the rubber holder 13 in the heightwise size.

(4) The rubber holder 13 includes the wall 13d between the backing accommodation slot 13b and the blade rubber accommodation slot 13c. The wall 13d includes the slit 13e extending vertically through a portion of the wall 13d. Thus, it is relatively easy to form the wall 13d with a small thickness dimension compared to a wall that lacks the slit 13e. More specifically, when a wall lacking the slit 13e is molded, resin would have to reach the entire wall. Thus, the design of a thin structure is difficult. However, the slit 13e reduces the region (distance) that the resin needs to reach. This allows for a thin structure.

(5) The slit 13e is located in the middle location of the wall 13d in the lateral direction and extends throughout the wall 13d in the longitudinal direction. This minimizes the area (extent) that the resin reaches while obtaining a structure in which the laterally opposite sides of the wall 13d press the upper portion 11a of the blade rubber 11 in a favorable manner. Thus, a thin structure may be obtained.

(6) Each lower extension 41b includes the thick portion 41d at the basal end side of the lower extension 41b. The lateral thicknesses A1, A2 of the thick portions 41d are each greater than the thickness Z of the portion of the receptacle 41a located between the backing 12 and the head 11c. This limits deformation, which, in turn, limits separation of the blade rubber 11, as compared to, for example, when there is no thick portion 41d (e.g., prior art in which the thickness is uniformly small through the entire portions to follow the curve of a wiped surface). That is, when there is no thick portion 41d (e.g., prior art in which the thickness is uniformly small through the entire portions), lower extensions would be easily deformed and separate the claws 41c from the basal end (upper portion). However, such a situation may be limited. Consequently, separation of the blade rubber 11 from the wiper case 14 is limited, for example, when a great friction force is applied to the blade rubber 11 during a wiping operation or when applying force to the wiper to move to a lock-back position under a freezing environment in which the wiper blade 11 is fixed with the wiped surface.

(7) Each thick portion 41d includes the inclined surface 41e, which is inclined so that the width increases toward the upper side. This increases the rigidity toward the basal end portion (upper portion) of the lower extensions 41b, from which deformation occurs. Additionally, for example, when the wiper case 14 is entirely inclined relative to the wiped surface together with the wiper blade 3 during a wiping operation, contact of the wiper case 14 with the wiped surface is limited.

(8) The lateral center line L1 of the receptacle 41a is offset from the lateral center line L2 between the claws 41c toward the vehicle rear side. This reduces the portion of the receptacle 41a bulged toward the front of the vehicle. As a result, pressure increases are limited that would be caused by air currents, which are produced when the vehicle travels, flowing toward the side (lower side) of the front-bulged wiper case 14, which is opposed to the wiped surface. This limits the separation of the wiper from the wiped surface.

The above embodiment may be modified as follows.

In the above embodiment, each of the draft slopes 13f, 13g extends straight and is inclined relative to the longitudinal straight line as viewed from the side. However, each draft slope may have any shape as long as the rubber holder 13 may be smoothly removed from the mold.

Figure 8:
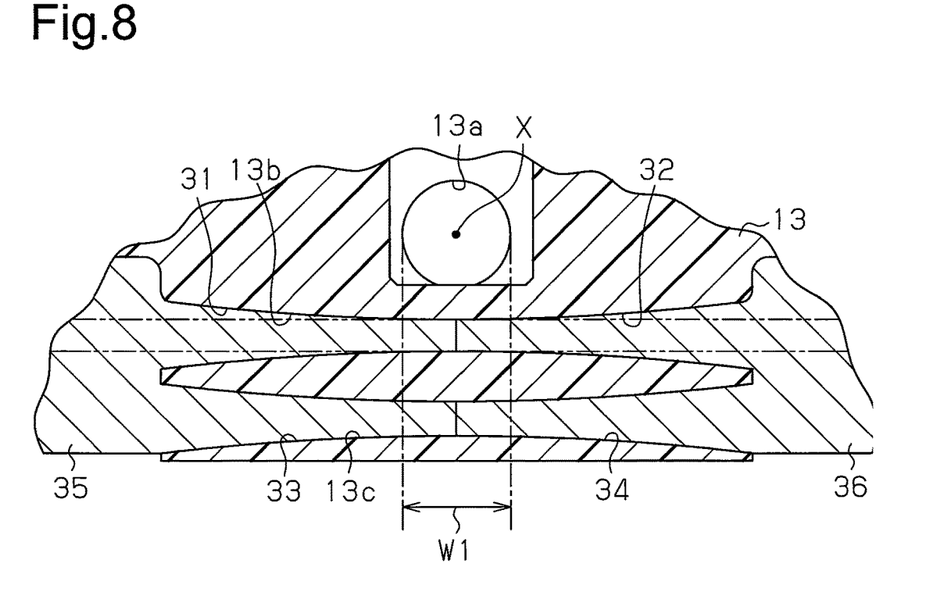
FIG. 8 is a schematic diagram illustrating a further example of draft slopes and rubber-side draft slopes.

As shown in FIG. 8, a modified example may include draft slopes 31, 32 that curve and extend at a descending gradient from the parting line toward longitudinally outer sides as viewed from the side. Additionally, in this example (refer to FIG. 8), the rubber-side draft slopes 13h, 13i of the above embodiment are changed to rubber-side draft slopes 33, 34 that curve and extend at a descending gradient from the rubber-side parting line toward the longitudinally outer sides as viewed from the side. In this case, the slide cores 21, 22 of the above embodiment used in the manufacturing method are changed to slide cores 35, 36 that are shaped corresponding to the draft slopes 31, 32 and the rubber-side draft slopes 33, 34.

In the above embodiment, the draft slopes 13f, 13g extend from the position corresponding to (immediately below) the axis X of the shaft insertion hole 13a in the longitudinal direction toward the longitudinally opposite sides. However, the draft slopes 13f, 13g may extend from another position in the longitudinally middle section of the backing accommodation slot 13b toward opposite outer sides in the longitudinal direction. In this case, it is preferred to form the draft slopes from the range W1, which corresponds to the shaft insertion hole 13a in the longitudinal direction, toward the longitudinal opposite sides. Additionally, in the above embodiment, the draft slopes 13f, 13g extend from the parting line P1. However, the origin of the draft slopes 13f, 13g does not have to conform to the parting line P1.

In the above embodiment, the rubber-side draft slopes 13h, 13i extend from the rubber-side parting line P2, which is set in a position corresponding to (immediately below) the axis X of the shaft insertion hole 13a in the longitudinal direction, toward the longitudinally opposite sides. However, the rubber-side draft slopes 13h, 13i may extend from another position in the longitudinally middle section of the blade rubber accommodation slot 13c toward opposite outer sides in the longitudinal direction.

In the above embodiment, the slit 13e vertically extends through a portion of the wall 13d between the backing accommodation slot 13b and the blade rubber accommodation slot 13c. However, the slit 13e may be omitted from the structure. Additionally, in the above embodiment, the wall 13d is formed by separately forming the blade rubber accommodation slot 13c below the backing accommodation slot 13b. However, the structure may be changed so that a blade rubber accommodation slot is continuously formed below a backing accommodation slot without being separated. In this case, the wall 13d is not formed. Also, the upper portion 11a of the blade rubber 11 is in contact with the backing 12.

In the present embodiment, the slit 13e is formed in the laterally middle location of the wall 13d throughout in the longitudinal direction. However, the slit 13e may be formed in a different portion of the wall 13d. For example, slits may be intermittently formed in the longitudinal direction.

In the above embodiment, the shaft insertion hole 13a supports the clip 16 so that the clip 16 is pivotal about the axis extending in the lateral direction of the rubber holder. The rubber holder 13 includes the shaft insertion hole 13a, which functions as a support. However, the rubber holder 13 may include a shaft functioning as a support that supports a clip (wiper arm coupling member).

The above embodiment includes the single backing 12. Instead, a wiper blade may include two backings. In this case, two opposite side surfaces of the upper portion 11a of the blade rubber 11 may each include a longitudinal side groove. The longitudinal side grooves accommodate the backings.

In the above embodiment, the thick portion 41d includes the inclined surface 41e that is inclined so that the width increases toward the upper side. However, the inclined surface 41e may be omitted. For example, the thick portion may be uniformly thick in the lateral direction.

In the above embodiment, the lateral center line L1 of the receptacle 41a is offset from the lateral center line L2 between the claws 41c toward the vehicle rear side. Instead, for example, the lateral center line L1 of the receptacle 41a may conform to the lateral center line L2 between the claws 41c.

In the above embodiment, the wiper case 14 includes the fin 42. However, the wiper case 14 may exclude the fin 42 (include only the case body 41).

The invention claimed is:

1. A wiper blade comprising:
a rubber holder;
a backing having a plate spring-like shape; and
a blade rubber operative to wipe a wiped surface, wherein
the rubber holder holds an intermediate portion of the blade rubber in a longitudinal direction and an intermediate portion of the backing in the longitudinal direction, the rubber holder includes:
a backing accommodation slot forming a first opening in the rubber holder that extends through the rubber holder in a direction extending along a longitudinal direction of the backing to receive and hold the backing; a blade rubber accommodation slot forming a second opening in the rubber holder, the second opening spaced apart from, and disposed below, the first opening, the second opening extending longitudinally parallel to the first opening, the blade rubber accommodation slot adapted to receive and hold an uppermost portion of the blade rubber; and
a third opening extending longitudinally parallel to the first opening and the second opening and disposed between the first opening and the second opening, the third opening having a width dimension less than a width dimension of the first opening and less than a width dimension of the second opening, wherein no portion of the blade rubber extends into the third opening when the blade rubber is received in the second opening, wherein
the blade rubber includes
a head located in the second opening,
a narrow portion, wherein the narrow portion has a smaller width than the head and extends downward, and
a wiping portion used to wipe the wiped surface,
the wiper blade further includes a wiper case located above the blade rubber,
the wiper case holds the blade rubber and the backing,
the wiper case includes
a receptacle that accommodates and holds the backing,
two lower extensions that extend downward from the receptacle and cover lateral sides of the head, and
claws that respectively extend from lower ends of the two lower extensions toward a laterally inner side, wherein the claws are opposed to a lower surface of the head and hold the head,
each of the lower extensions includes a thick portion located at a basal side of the lower extension, and
each thick portion has a lateral thickness that is greater than a thickness of a portion of the receptacle located between the backing and the head.

2. The wiper blade according to claim 1, wherein
the rubber holder further includes a support that supports a wiper arm coupling member,
the backing accommodation slot includes a portion that longitudinally corresponds to the support, and
the backing accommodation slot includes a smallest height dimension at the portion that longitudinally corresponds to the support.

3. The wiper blade according to claim 2, wherein the portion of the backing accommodation slot that longitudinally corresponds to the support includes an imaginary cross section extending along a direction perpendicular to the longitudinal direction, and when viewing the imaginary cross section, the third opening extends vertically between the backing accommodation slot and the blade rubber accommodation slot.

4. The wiper blade according to claim 1, wherein the third opening is located in a middle location in a lateral direction of the blade rubber and extends throughout the rubber holder in the rubber longitudinal direction.

5. The wiper blade according to claim 1, wherein each thick portion includes an inclined surface that is inclined so that the thick portion widens toward an upper side.

6. The wiper blade according to claim 1, wherein a lateral center line of the receptacle is offset from a lateral center line between the claws toward a vehicle rear side.

7. The wiper blade according to claim 1, wherein the rubber holder further includes a fourth opening below the second opening.

8. A wiper blade comprising:
a rubber holder;
a backing having a plate spring-like shape; and
a blade rubber operative to wipe a wiped surface, wherein
the rubber holder holds an intermediate portion of the blade rubber in a longitudinal direction and an intermediate portion of the backing in the longitudinal direction, the rubber holder includes:

a backing accommodation slot forming a first opening in the rubber holder that extends through the rubber holder in a direction extending along a longitudinal direction of the backing to receive and hold the backing;

a blade rubber accommodation slot forming a second opening in the rubber holder, the second opening spaced apart from, and disposed below, the first opening, the second opening extending longitudinally parallel to the first opening, the blade rubber accommodation slot adapted to receive and hold an uppermost portion of the blade rubber; and a third opening extending longitudinally parallel to the first opening and the second opening and disposed between the first opening and the second opening, the third opening having a width dimension less than a width dimension of the first opening and less than a width dimension of the second opening, wherein no portion of the blade rubber extends into the third opening when the blade rubber is received in the second opening, wherein the blade rubber includes a head located in the second opening, a narrow portion, wherein the narrow portion has a smaller width than the head and extends downward, and a wiping portion extending below the narrow portion and used to wipe the wiped surface, the wiper blade further includes a wiper case located above the blade rubber, the wiper case holds the blade rubber and the backing, the wiper case includes a receptacle that accommodates and holds the backing, two lower extensions that extend downward from the receptacle and cover lateral sides of the head, and claws that respectively extend from lower ends of the two lower extensions toward a laterally inner side, wherein the claws are opposed to a lower surface of the head and hold the head, each of the lower extensions includes a thick portion located at an outer side of the lower extension, and the thick portions limit deformation of the lower extensions relative to basal ends of the lower extensions that would separate the claws.

9. The wiper blade according to claim 8, wherein the rubber holder further includes a support that supports a wiper arm coupling member, the backing accommodation slot includes a portion that longitudinally corresponds to the support, and the backing accommodation slot includes a smallest height dimension at the portion that longitudinally corresponds to the support.

10. The wiper blade according to claim 9, wherein the portion of the backing accommodation slot that longitudinally corresponds to the support includes an imaginary cross section extending along a direction perpendicular to the longitudinal direction, and when viewing the imaginary cross section, the third opening extends vertically between the backing accommodation slot and the blade rubber accommodation slot.

11. The wiper blade according to claim 8, wherein the third opening is located in a middle location in a lateral direction of the blade rubber and extends throughout the rubber holder in the longitudinal direction.

12. The wiper blade according to claim 8, wherein each thick portion includes an inclined surface that is inclined so that the thick portion widens toward an upper side.

13. The wiper blade according to claim 8, wherein a lateral center line of the receptacle is offset from a lateral center line between the claws toward a vehicle rear side.

14. The wiper blade according to claim 8, wherein the rubber holder further includes a fourth opening below the second opening.

* * * * *